(12) United States Patent
Campomizzi

(10) Patent No.: US 6,451,902 B2
(45) Date of Patent: *Sep. 17, 2002

(54) NITRILE POLYMER VULCANIZATE AND PROCESS FOR THE PRODUCTION THEREOF

(75) Inventor: Ezio Campomizzi, Sarnia (CA)

(73) Assignee: Bayer Inc., Sarnia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/813,195

(22) Filed: Mar. 20, 2001

Related U.S. Application Data

(62) Division of application No. 09/261,541, filed on Mar. 3, 1999, now Pat. No. 6,214,922.

(30) Foreign Application Priority Data

Jun. 3, 1998 (CA) .............................................. 2231300

(51) Int. Cl.⁷ ................................................ C08L 47/00
(52) U.S. Cl. ........................ 524/511; 524/492; 524/495; 524/523; 524/524; 525/233; 525/238; 525/294
(58) Field of Search ................................. 524/495, 497, 524/511, 492, 525, 524, 523; 525/233, 238, 294, 295

(56) References Cited

U.S. PATENT DOCUMENTS 5,683,819 A * 11/1997 Mori et al. .................. 428/500
6,214,922 B1 * 4/2001 Campomizzi ............... 524/511

FOREIGN PATENT DOCUMENTS

GB 1558491 1/1980
JP 61066724 A * 4/1986

* cited by examiner

Primary Examiner—Edward J. Cain
(74) Attorney, Agent, or Firm—Joseph C. Gil; Noland J. Cheung

(57) ABSTRACT

A nitrite polymer vulcanizate having improved hot air aging characteristics is described. The nitrile polymer vulcanizate may be produced admixing a composition comprising: (i) a nitrite polymer; (ii) a filler; (iii) an additive selected from the group comprising a strong base, a salt of a strong base and a weak acid, a salt of a weak acid, a carbodiimide, a polycarbodiimide and mixtures thereof; and (iv) a vulcanization system. A vulcanizable composition useful for producing such a vulcanizate and a method for improving the hot air aging characteristics of a nitrite polymer are also described.

27 Claims, 5 Drawing Sheets

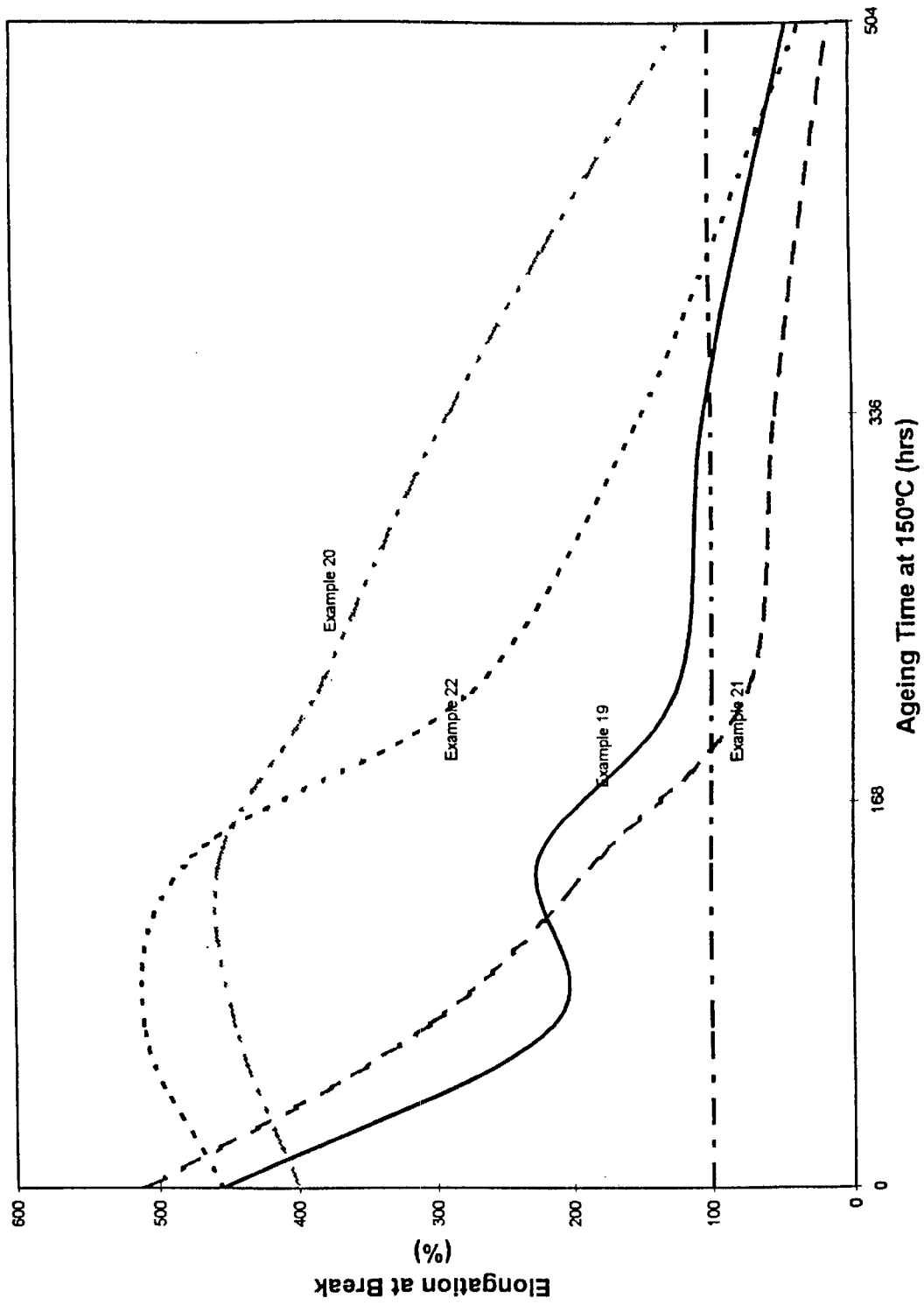

NITRILE POLYMER VULCANIZATE AND PROCESS FOR THE PRODUCTION THEREOF

This application is a division of application Ser. No. 09/261,541, filed Mar. 3, 1999, now U.S. Pat. No. 6,214,922.

FIELD OF THE INVENTION

The present invention relates to an improved nitrile polymer vulcanizate and to a process for the production thereof. More particularly, in one of its aspects, the present invention relates to nitrile polymer vulcanizates having improved hot air aging characteristics. In another of its aspects, the present invention relates to a vulcanizable composition useful to produce such vulcanizates. In yet another of its aspects, the present invention relates to a method for improving the hot air aging characteristics of a nitrile polymer vulcanizate.

BACKGROUND OF THE INVENTION

The effects of oxidizing conditions on vulcanizates obtained from polymers having carbon-carbon double bond unsaturation have long been a problem, particularly in applications where the vulcanizates are exposed to elevated temperatures for extended periods of time. A variety of approaches have been developed in the art in an attempt to solve this problem.

It is known that the carbon-carbon double bonds of such polymers activate the vulcanizate to oxidative attack. One solution to the problem of oxidative attack is to use polymers with few or no carbon-carbon double bonds. Examples of such polymers include butyl rubber (copolymers of isobutylene and isoprene) which typically contain from about 0.5 to about 3.0 mole percent of carbon-carbon double bond unsaturation, and ethylene-propylene copolymers which contain no such unsaturation.

Certain applications, such as the various hoses and seals in the engine compartment of automobiles, require vulcanized polymers with a combination of oil resistance, and resistance to oxidative attack in air at elevated temperatures for extended periods of time. Vulcanizates of copolymers of conjugated dienes and α,β-unsaturated nitriles, such as acrylonitrile-butadiene copolymer, commonly known as nitrile rubber or NBR, are well known for their oil resistance. However, they contain carbon-carbon double bond unsaturation and therefore are susceptible to oxidative attack unless subjected to special compounding procedures for the production of oxidation resistant vulcanizates.

In order to reduce the amount of carbon-carbon double bond unsaturation in NBR and yet retain the copolymer's oil resistance which is thought to be provided by the nitrile functional groups in the copolymer, methods have been developed to selectively hydrogenate the carbon-carbon double bond unsaturation of NBR without hydrogenating the nitrile groups to produce hydrogenated NBR or HNBR. See for example, British patent 1,558,491, the contents of which are hereby incorporated by reference.

While the development of HNBR has been a significant advance in the art, there is still room for improvement. Specifically, there is a continuing need to develop nitrile polymer vulcanizates which are characterized by improved physical properties such as hot air aging and the like.

SUMMARY OF THE INVENTION

It is an object of the present invention to obviate or mitigate at least one of the above-mentioned disadvantages of the prior art.

It is another object of the present invention to provide a novel nitrile polymer vulcanizate.

It is yet another object of the present invention to provide a novel process for producing a nitrile polymer vulcanizate.

It is yet another object of the present invention to provide a novel vulcanizable composition for producing a nitrile polmer vulcanizate.

It is yet another object of the present invention to provide a novel method for improving the hot air aging characteristics of a nitrile polymer vulcanizate.

Accordingly, in one of its aspects, the present invention provides a nitrile polymer vulcanizate produced by vulcanizing a composition comprising:

(i) a nitrile polymer;
(ii) a filler;
(iii) an additive selected from the group comprising: a strong base, a salt of strong base and a weak acid, a salt of a weak acid, a carbodiimide, a polycarbodiimide and mixtures thereof; and
(iv) a vulcanization system.

In another of its aspects, the present invention provides a process for producing a nitrile polymer vulcanizate comprising the step of admixing a polymer composition comprising:

(i) a nitrile polymer;
(ii) a filler;
(iii) an additive selected from the group comprising: a strong base, a salt of strong base and a weak acid, a salt of a weak acid, a carbodiimide, a polycarbodiimide and mixtures thereof; and
(iv) a vulcanization system.

In yet another of its aspects, the present invention provides a vulcanizable composition comprising:

(i) a nitrite polymer;
(ii) a filler;
(iii) an additive selected from the group comprising: a strong base, a salt of strong base and a weak acid, a salt of a weak acid, a carbodiimide, a polycarbodiimide and mixtures thereof; and
(iv) a vulcanization system.

In yet another of its aspects, the present invention provides a method for improving the hot air aging characteristics of a nitrite polymer comprising the step of admixing a nitrile polymer with an additive selected from the group comprising: a strong base, a salt of a strong base and a weak acid, a salt of a weak acid, a carbodiimide, a polycarbodiimide and mixtures thereof.

In yet another of its aspects, the present invention provides a hydrogenated nitrile polymer vulcanizate having a hot air aging time to reach 100% elongation at break of at least about 200 hours when measured pursuant to ASTM-D573-88 at 150° C., the vulcanizate derived from a sulfur-based vulcanization system.

Thus, it has been discovered that incorporation of a particular additive in a nitrile polymer vulcanizate results in a surprising and unexpected improvement in the hot air aging characteristics of the vulcanizate (i.e., an improvement in the resistance to oxidative attack in air at elevated temperature aging under oxidizing conditions). The improvement in the hot air aging characteristics of the vulcanizate can manifest itself in a number of ways, including (by way of example only) an increase in: (i) the period of time needed for the vulcanizate to reach 100% elongation at break at 150° C.; and (ii) the maximum service temperature to which the vulcanizate can be exposed for a specified period of time before reaching 100% elongation at break, when compared to a vulcanizate made without the additive. The present vulcanizates may also be characterized by improvement (i.e., in comparison to a vulcanizate produced without the additive) in one or more of the following properties: aged hot fluid aging, aged compression set, aged dynamic elastic modulus (E'), aged dynamic viscous modulus (E"), aged static modulus, aged low temperature properties and aged hardness.

BRIEF DESCRIPTION OF THE DRAWINGS

Embodiments of the present invention will be described with reference to the accompanying drawings, in which:

FIGS. 1–5 illustrate comparative hot air aging characteristics between nitrile polymer vulcanizates of the invention and conventional nitrile polymer vulcanizates.

DETAILED DESCRIPTION OF THE INVENTION

Figure 1:
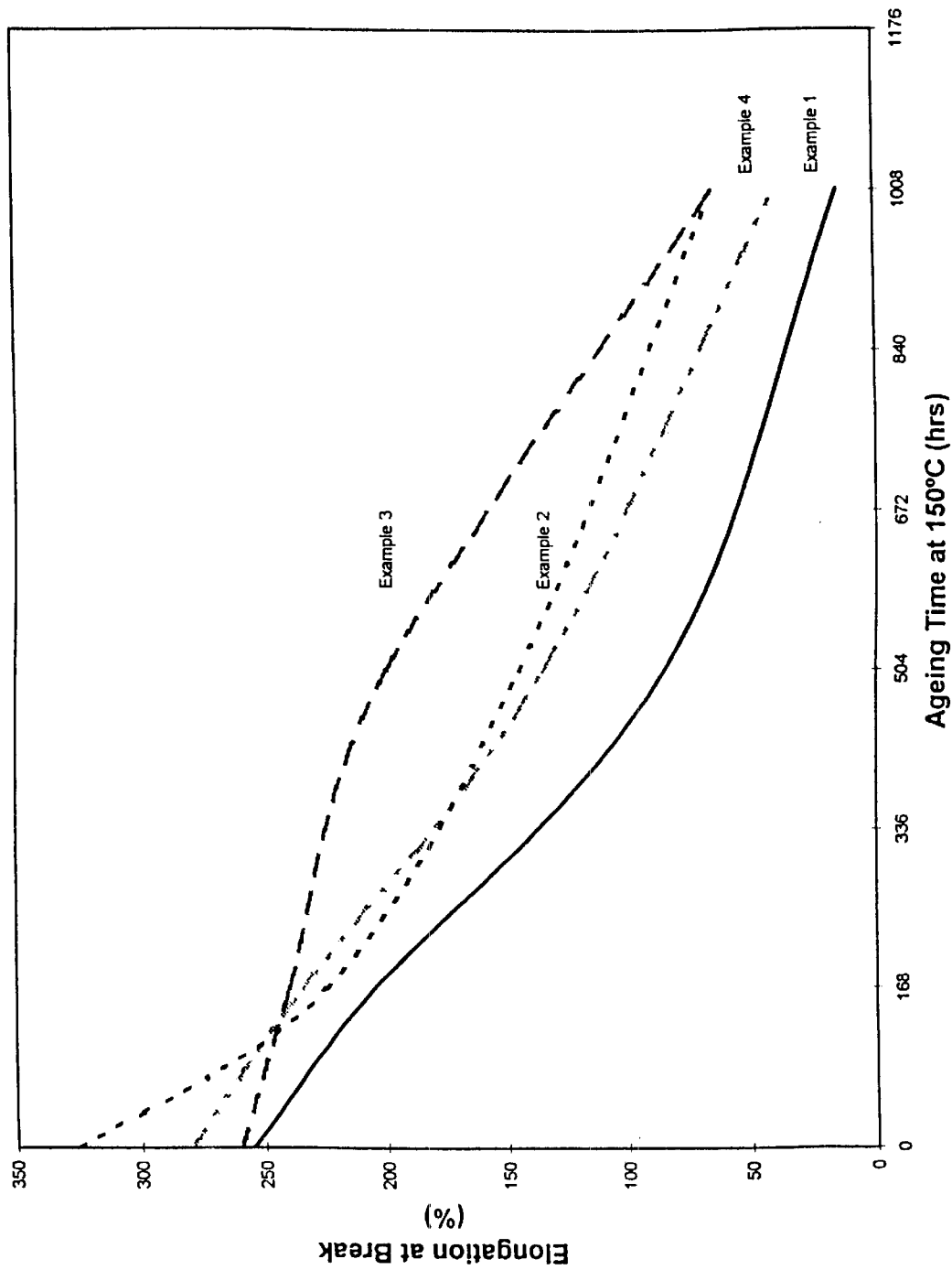

Thus, various aspects of the present application relate to a composition comprising:

(i) a nitrile polymer;
(ii) a filler;
(iii) an additive selected from the group comprising: a strong base, a salt of strong base and a weak acid, a salt of a weak acid, a carbodiimide, a polycarbodiimide and mixtures thereof; and
(iv) a vulcanization system.

Components (i), (ii), (iii) and (iv) may be added independently of one another or in one or more sub-combinations thereof.

As used throughout this specification, the term "nitrile polymer" is intended to have a broad meaning and is meant to encompass a copolymer of a conjugated diene and an unsaturated nitrile.

The conjugated diene may be a $C_4$–$C_6$ conjugated diene. Non-limiting examples of suitable such conjugated dienes may be selected from the group comprising butadiene, isoprene, piperylene, 2,3-dimethyl butadiene and mixtures thereof. The preferred $C_4$–$C_6$ conjugated diene may be selected from the group comprising butadiene, isoprene and mixtures thereof. The most preferred $C_4$–$C_6$ conjugated diene is butadiene.

The unsaturated nitrile may be a $C_3$–$C_5$ α,β-unsaturated nitrile. Non-limiting examples of suitable such $C_3$–$C_5$ α,β-unsaturated nitrites may be selected from the group comprising acrylonitrile, methacrylonitrile, ethacyrlonitrile and mixtures thereof. The most preferred $C_3$–$C_5$ α,β-unsaturated nitrile is acrylonitrile.

Preferably, the copolymer comprises from about 40 to about 85 weight percent of the copolymer of bound conjugated diene and from about 15 to about 60 weight percent of the copolymer of bound unsaturated nitrite. More preferably, the copolymer comprises from about 60 to about 75 weight percent of the copolymer of bound conjugated diene and from about 25 to about 40 weight percent of the copolymer of bound unsaturated nitrite. Most preferably, the copolymer comprises from about 60 to about 70 weight percent of the copolymer of bound conjugated diene and from about 30 to about 40 weight percent of the copolymer of bound unsaturated nitrile.

Optionally, the copolymer may further comprise a bound unsaturated carboxylic acid. Non-limiting examples of suitable such bound unsaturated carboxylic acids may be selected from the group comprising fumaric acid, maleic acid, acrylic acid, methacrylic acid and mixtures thereof. The bound unsaturated carboxylic acid may be present in an amount of from about 1 to about 10 weight percent of the copolymer, with this amount displacing a corresponding amount of the conjugated diolefin.

Further, a third monomer may be used in production of the nitrite polymer. Preferably, the third monomer is an unsaturated mono- or di-carboxylic acid or derivative thereof (e.g., esters, amides and the like).

While the invention may be used with fully or partially unsaturated nitrite polymers, a particularly preferred group of nitrite polymers useful in the production of the present vulcanizate are hydrogenated or partially hydrogenated nitrite polymers (also known in the art as HNBR). Preferably, the copolymer is hydrogenated and comprises a residual carbon-carbon double bond unsaturation of less than about 30, more preferably from about 30 to about 0.05 mole percent, even more preferably from about 15 to about 0.05 mole percent, even more preferably from about 10.0 to about 0.05 mole percent, even more preferably from about 7.0 to about 0.05 mole percent, most preferably from about 5.5 to about 0.05 mole percent.

The vulcanizable polymer composition preferably further comprises a filler. The nature of the filler is not particularly restricted and the choice of suitable fillers is within the purview of a person skilled in the art. Non-limiting examples of suitable fillers include carbon black (e.g., FEF, MT, GPF and SRF), clays, titanium dioxide, silica fillers (with or without unsaturated silanes) and the like. The amount of filler is conventional. Preferably, the filler is present in an amount in the range of from about 20 to about 130 parts by weight per hundred parts by weight of the nitrite polymer. More preferably, the filler is present in an amount in the range of from about 20 to about 100 parts by weight per hundred parts by weight of the nitrite polymer. Most preferably, the filler is present in an amount in the range of from about 40 to about 80 parts by weight per hundred parts by weight of the nitrite polymer.

The vulcanizable polymer composition further comprises an additive selected from the group comprising: a strong base, a salt of strong base and a weak acid, a salt of a weak acid, a polycarbodiimide, a carbodiimide and mixtures thereof. Non-limiting examples of strong bases useful in the present vulcanizate may be inorganic bases selected from the group comprising sodium hydroxide, potassium hydroxide, calcium oxide and the like. Preferably, the salt has a $pk_a$ of at least about 9.0, more preferably at least about 10.0, most preferably in the range of from about 10.0 to about 14.0. A preferred group of additives comprises a Group I metal (e.g., sodium, potassium, etc.) salt of a weak acid (e.g., carbonic acid, phosphonic acid, boric acid, $C_1$–$C_{30}$ fatty acids and the like.) Non-limiting examples of salts useful in the present vulcanizate may be selected from the group comprising sodium carbonate, sodium acetate, sodium phosphate, potassium carbonate, sodium stearate, sodium EDTA and mixtures thereof. The most preferred salt is sodium carbonate.

The additive is present in an amount of from about 0.5 to about 30 parts by weight per hundred parts by weight of nitrile polymer, more preferably from about 1.0 to about 10.0 parts by weight per hundred parts by weight of nitrile polymer, most preferably from about 2.0 to about 8.0 parts by weight per hundred parts by weight of nitrile polymer.

The vulcanization system used in producing the present nitrile polymer vulcanizate is conventional and the choice thereof is within the purview of a person skilled in the art.

In one embodiment, the vulcanization system used in the present invention comprises an organic peroxide (e.g., dicumyl peroxide, 2,2'-bis(tert-butylperoxy diisopropylbenzene and the like).

In another embodiment, the vulcanization system used in the present invention comprises sulfur or a conventional sulfur-containing vulcanization product such as Vulkacit™ DM/C (benzothiazyl disulfide), Vulkacit™ Thiuram MS/C (tetramethyl thiuram monosulfide), Vulkacit™ Thiuram/C (tetramethyl thiuram disulfide), mixtures thereof and the like. Preferably, such sulfur-based vulcanization systems further comprise a peroxide such as zinc peroxide.

In yet another embodiment, the vulcanization system used in the present invention comprises a reactive phenol-formaldehyde resin and a Lewis acid activator. It is known to those skilled in the art that a reactive phenol-formaldehyde resins may be prepared by reacting a para-substituted phenol with a molar excess of formaldehyde—see, for example, U.S. Pat. No. 2,726,224, the contents of which are hereby incorporated by reference. The use of such phenol-formaldehyde resins in vulcanization systems for butyl rubber is well known.

The vulcanization system used in the present process preferably contains at least about 3 parts by weight reactive phenol-formaldehyde resin per hundred parts by weight nitrile polymer. It is especially preferred to use from about 8 to about 16 parts by weight of the reactive phenol-formaldehyde resin per hundred parts by weight polymer. If more than about 16 parts by weight of the resin per hundred parts of nitrile polymer are employed, the entire composition tends to become resinous, and hence such high levels of resin are generally undesirable.

The Lewis acid activator may be present as a separate component such as stannous chloride ($SnCl_2$) or poly (chlorobutadiene). Alternatively, the Lewis acid activator may be present within the structure of the resin itself—for example, bromomethylated alkyl phenol-formaldehyde resin (which may be prepared by replacing some of the hydroxyl groups of the methylol group of the resin discussed above with bromine). The use of such halogenated resins in vulcanization systems for butyl rubber is well known to those skilled in the art.

In the present process, the nitrile polymer, the filler, the additive and the vulcanization system may be admixed in any conventional manner known to the art. For example, this polymer composition may be admixed on a two-roll rubber mill or an internal mixer. The preferred hydrogenated nitrile copolymer used in the present process tends to be quite stiff, and is prone to bag when mixed on a two-roll rubber mill. The addition of a reactive phenol-formaldehyde resin improves the mixing of the hydrogenated copolymer by reducing the bagging problem.

Thus, the polymer composition is mixed in a conventional manner and the temperature thereof during mixing is maintained as is known in the art.

In the present process, it is preferred to heat the polymer composition to form vulcanizates using conventional procedures well known in the art. Preferably, the polymer composition is heated to a temperature in the range of from about 130° to about 200° C., preferably from about 140° to about 190° C., more preferably from about 150° to about 180° C.

Preferably, the heating is conducted for a period of from about 1 minutes to about 15 hours, more preferably from about 5 minutes to about 30 minutes.

Other conventional compounding ingredients may also be included by mixing with the copolymer in the conventional manner. Such other compounding ingredients are used for their conventional purposes and include activators such as zinc oxide and magnesium oxide; anti-oxidants such as diphenyl amines and the like; stearic acid; plasticizers; processing aids; reinforcing agents; fillers; promoters and retarders in amounts well known in the art.

Embodiments of the present invention will be illustrated with reference to the following Examples which are provided for illustrative purposes and should not be used to limit the scope of the invention.

Further, in the Examples, the following materials were used:

Therban™ XN532A/A4307: a hydrogenated nitrile butadiene polymer commercially available from Bayer Inc.;

Therban™ A4555: a hydrogenated nitrile butadiene polymer commercially available from Bayer Inc.;

Therban™ A3407: a hydrogenated nitrile butadiene polymer commercially available from Bayer Inc.;

Therban™ XN533A (A3907): a hydrogenated nitrile butadiene polymer commercially available from Bayer Inc.;

Therban™ XN541C: a nitrile butadiene polymer having a residual double bond content of 2–4% and commercially available from Bayer Inc.;

Therban™ XO543C/C3467: a nitrile butadiene polymer having a residual double bond content of 5.5% and commercially available from Bayer Inc.;

HNBR#1: a hydrogenated nitrile butadiene polymer having a residual double bond content of 4%;

HNBR#2: a hydrogenated nitrile butadiene polymer having a residual double bond content of 10%;

Rhenogran™ P-50: polycarbodiimide commercially available from Rhein Chemie;

Dynamar™ L 13890: sodium carbonate commercially available from Dyneon;

Suprapur™ 6395: sodium carbonate (soda ash) commercially available from EM Industries;

Sodium Stearate: additive;

Stearic Acid NBS: dispersing agent;

Vulkanox™ OCD/SG: antidegradant commercially available from Bayer Inc.;

Vulkanox™ ZMB-2/C5: antidegradant commercially available from Bayer Inc.;

Vulkacit™ DM/C: benzothiazyl disulfide vulcanizing agent commercially available from Bayer Inc.;

Vulkacit™ Thiuram MS/C: tetramethyl thiuram monosulfide vulcanizing agent commercially available from Bayer Inc.;

Vulkacit™ Thiuram/C: tetramethyl thiuram disulfide vulcanizing agent commercially available from Bayer Inc.;

Maglite™ D: magnesium oxide, activator, commercially available from CP Hall;

Zinc Oxide: activator;

N660 Carbon Black: filler;

Carbon Black, IRB#6: filler;

Plasthall™ TOTM: plasticizer commercially available from CP Hall;

Spider Sulfur: vulcanizing agent;

DIAK™ #7: triallyl isocyanate, cross-linking activator, commercially available from E. I. DuPont; and Vulcup™ 40KE: 2,2'-bis(tert-butylperoxy diisopropylbenzene commercially available from Hercules.

EXAMPLES 1–4

The following procedure was used for each of Examples 1–4. The polymer composition used in Examples 1–4 are shown in Table 1. As will be apparent to those of skill in the art, the polymer composition of Example 1 contains no special additive. Accordingly, Example is provided for comparison purposes only and is outside the scope of the present invention.

The components of the polymer composition were mixed in a Banbury mixer using conventional techniques. The polymer composition was vulcanized at 180° C. for a period of 12 minutes.

The tensile stress at rupture ("tensile strength") of the vulcanizates was determined in accordance with ASTM D412-80. Hot air aging properties of the vulcanizates were determined in accordance with ASTM-D573-88. Hardness properties were determined using a Type A Shore durometer in accordance with ASTM-D2240-8 1. The properties of the vulcanizates are reported in Table 2. The hot air aging properties of the vulcanizates are also illustrated in FIG. 1.

The properties of the vulcanizates reported in Table 2 and illustrated in FIG. 1 clearly illustrate the superiority of the hot air aging characteristics of the vulcanizates of Examples 2–4 (special additive used) when compared to the vulcanizate of Example 1 (conventional MgO additive used). FIG. 1 is particularly instructive in showing the significant improvement in the time needed for the aged vulcanizate to reach 100% elongation at break under the test conditions. This translates into a significant practical advantages in many of the conventional applications of the vulcanizates.

EXAMPLES 5–9

The methodology used in Examples 1–4 was repeated in these Examples using the polymer compositions reported in Table 3. As will be apparent to those of skill in the art, the polymer composition of Example 5 contains no special additive and the polymer compositions of Examples 6 and 7 contain a conventional additive (MgO). Accordingly, Examples 5–7 are provided for comparison purposes only and are outside the scope of the present invention.

Various physical properties of the vulcanizates were determined as described in Examples 1–4. These properties are reported in Table 4. The hot air aging properties of the vulcanizates are also illustrated in FIG. 2.

Figure 2:
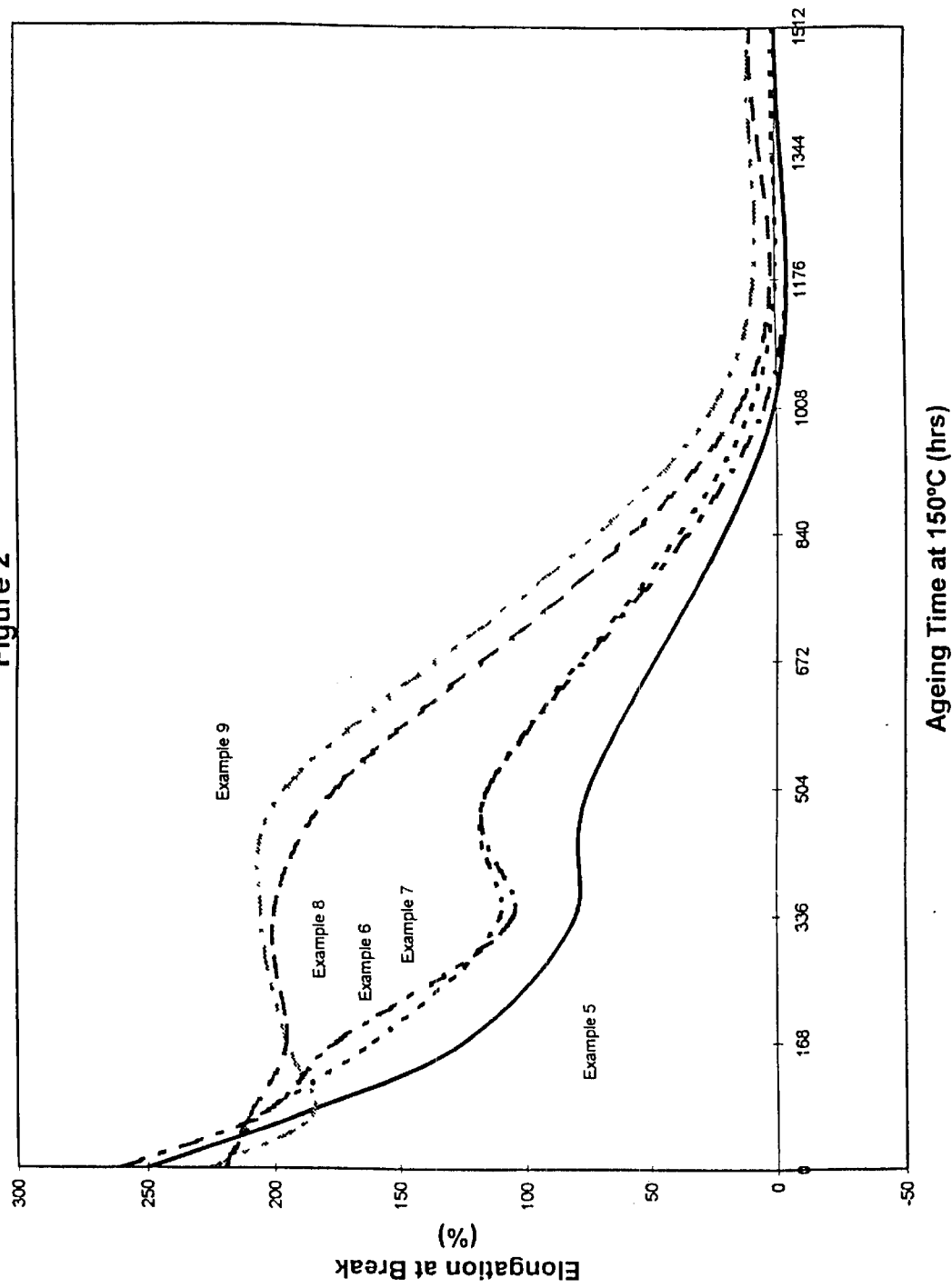

The properties of the vulcanizates reported in Table 4 and illustrated in FIG. 2 clearly illustrate the superiority of the hot air aging characteristics of the vulcanizates of Examples 8 and 9 (special additive used) when compared to the vulcanizate of Example 5 (no additive used) and Examples 6 and 7 (conventional MgO additive used). FIG. 2 is particularly instructive in showing the significant improvement in the time needed for the aged vulcanizate to reach 100% elongation at break under the test conditions. Again, this translates into a significant practical advantages in many of the conventional applications of the vulcanizates. FIG. 2 is also instructive in showing that the advantages accruing from using sodium carbonate as a special additive: (i) can not be achieved simply by increasing the amount of conventional additive (MgO), and (ii) are apparent at lower and higher levels of the special additive.

EXAMPLES 10–14

The methodology used in Examples 5–9 was repeated in these Examples using the polymer compositions reported in Table 5. As will be apparent to those of skill in the art, the polymer composition of Example 10 contains no special additive and the polymer compositions of Examples 11 and 12 contain a conventional additive (MgO). Accordingly, Examples 10–12 are provided for comparison purposes only and are outside the scope of the present invention.

Various physical properties of the vulcanizates were determined as described in Examples 1–4. These properties are reported in Table 5. The hot air aging properties of the the vulcanizates are also illustrated in FIG. 3.

Figure 3:
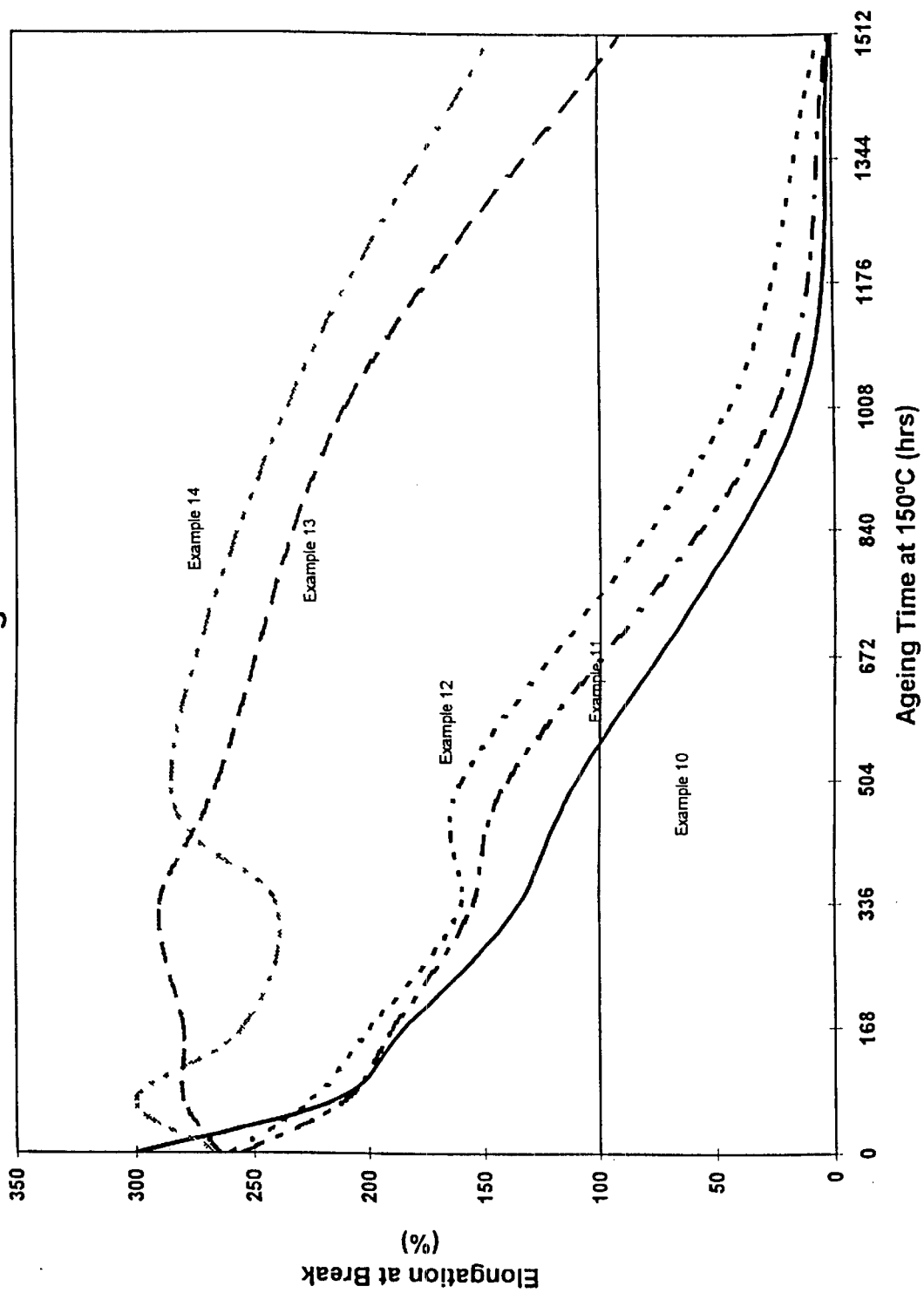

The properties of the vulcanizates reported in Table 5 and illustrated in FIG. 3 clearly illustrate the superiority of the hot air aging characteristics of the vulcanizates of Examples 13 and 14 (special additive used) when compared to the vulcanizate of Example 10 (no additive used) and Examples 11 and 12 (conventional MgO additive used). FIG. 3 is particularly instructive in showing the significant improvement in the time needed for the aged vulcanizate of Examples 13 and 14 to reach 100% elongation at break under the test conditions. Again, this translates into a significant practical advantage in many of the conventional applications of the vulcanizates. FIG. 3 is also instructive in showing that the trends and advantages discussed above with reference to Examples 1–9 are maintained even when a different nitrite rubber is used.

EXAMPLES 15–22

The methodology used in Examples 5–9 was repeated in these Examples using the polymer compositions reported in Table 7. As will be apparent to those of skill in the art, the polymer compositions of Examples 15, 17, 19 and 21 contain a conventional additive (MgO). Accordingly, Examples 15, 17, 19 and 21 are provided for comparison purposes only and are outside the scope of the present invention.

Figure 4:
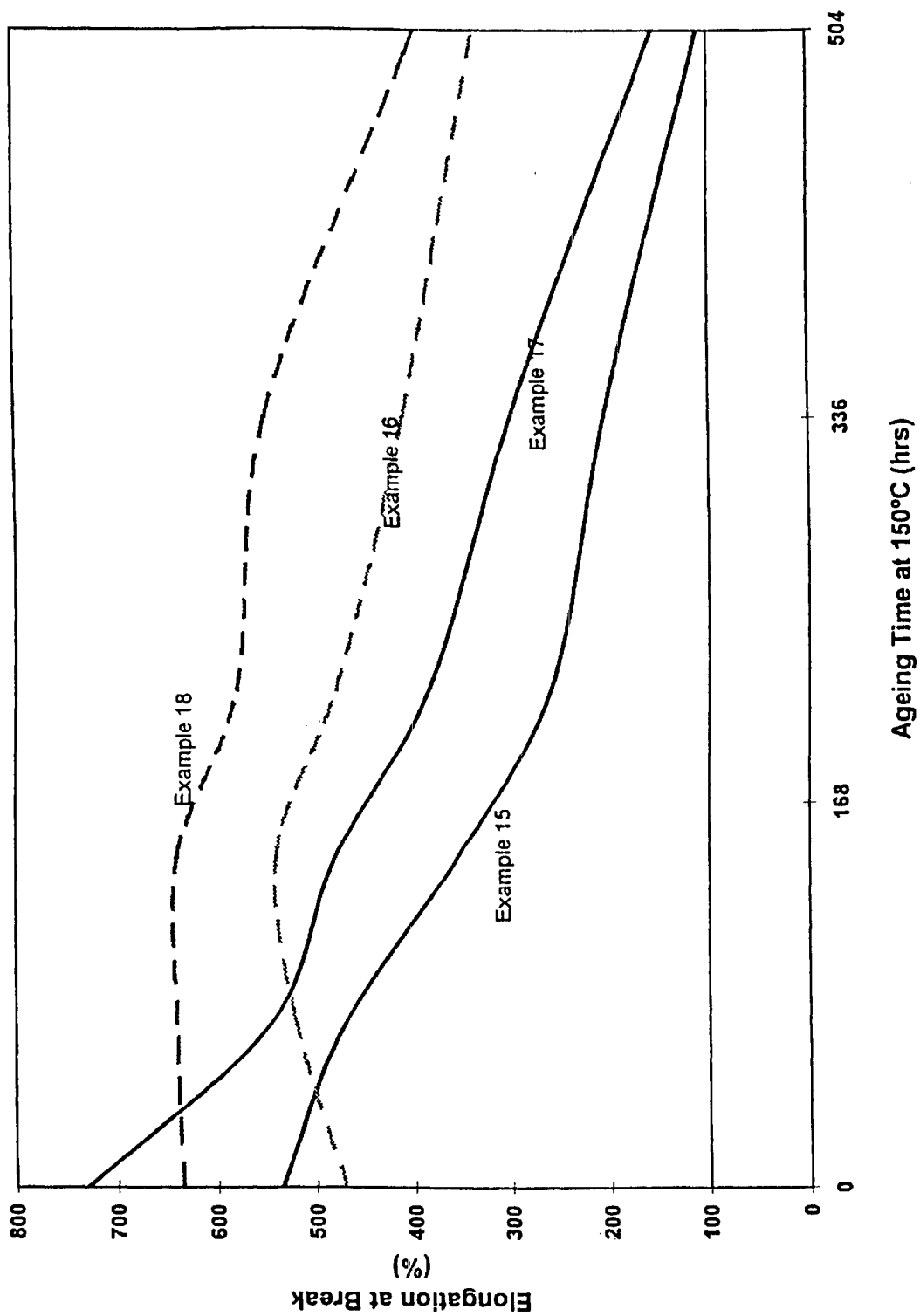

Various physical properties of the vulcanizates were determined as described in Examples 1–4. These properties are reported in Table 7. The hot air aging properties of the vulcanizates of Examples 15–18 are illustrated in FIG. 4 and those of the vulcanizates of Examples 19–22 are illustrated in FIG. 5. FIGS. 4 and 5 are particularly instructive in showing the significant improvement in the time needed for the aged vulcanizate of Examples of 16, 18, 20 and 22 to reach 100% elongation at break under the test conditions compared to the aged vulcanizate of Examples 15, 17, 19 and 21, respectively. Again, this translates into a significant practical advantage in many of the conventional applications of the vulcanizates. FIGS. 4 and 5 are also instructive in showing that the trends and advantages discussed above with reference to Examples 1–9 are maintained even when a nitrite rubber with a high residual double bond content is used.

EXAMPLES 23–30

The methodology used in Examples 5–9 was repeated in these Examples using the polymer compositions reported in Table 9. As will be apparent to those of skill in the art, the polymer compositions of Examples 23 and 26 contain no special additive, Examples 24, 27 and 29 contain a conventional additive (MgO). Accordingly, Examples 23, 24, 26, 27 and 29 are provided for comparison purposes only and are outside the scope of the present invention.

Various physical properties of the vulcanizates were determined as described in Examples 1–4. These properties are reported in Table 10. The results in Table 10 clearly evidence the significant improvement in hot air aging properties (time needed for the vulcanizate to reach 100% elongation at break under the test conditions) of the vulcanizates made with the sodium carbonate (Examples 25, 28 and 30) compared to vulcanizates made using a conventional additive (Examples 24, 27 and 29) or with no special additive (Examples 23 and 26). Again, this translates into significant practical advantages in many of the conventional applications of the vulcanizates.

TABLE 1

| Ingredient | Example 1 | 2 | 3 | 4 |
|---|---|---|---|---|
| Therban ™ XN532A/A4307 | 100 | 100 | 100 | 100 |
| Rhenogran ™ P-50 | — | 10 | — | — |
| Dynamar ™ L 13890 | — | — | 3 | — |
| Sodium Stearate | — | — | — | 2 |
| Vulkanox ™ OCD/SG | 1 | 1 | 1 | 1 |
| Vulkanox ™ ZMB-2/C5 | 0.4 | 0.4 | 0.4 | 0.4 |
| Maglite ™ D | 2 | 2 | 2 | 2 |
| Zinc Oxide | 2 | 2 | 2 | 2 |
| N660 Carbon Black | 50 | 50 | 50 | 50 |
| Plasthall ™ TOTM | 5 | 5 | 5 | 5 |
| DIAK ™ #7 | 1.5 | 1.5 | 1.5 | 1.5 |
| Vulcup ™ 40KE | 6.5 | 6.5 | 6.5 | 6.5 |

TABLE 2

| | Example 1 | 2 | 3 | 4 |
|---|---|---|---|---|
| Compound Mooney Scorch MS LR @ 125° C. (min.) | >30 | >30 | >30 | >30 |
| *Unaged Vulcanizate* | | | | |
| Hardness, Shore A (pts.) | 69 | 69 | 70 | 70 |
| Ultimate Elongation (%) | 255 | 325 | 260 | 280 |
| *Vulcanizate Aged For 168 Hours @150° C.* | | | | |
| Hardness, Shore A (pts.) | 80 | 80 | 82 | 80 |
| Ultimate Elongation (%) | 205 | 225 | 240 | 235 |
| *Vulcanizate Aged For 504 Hours @150° C.* | | | | |
| Hardness, Shore A (pts.) | 85 | 85 | 86 | 84 |
| Ultimate Elongation (%) | 85 | 145 | 200 | 135 |
| *Vulcanizate Aged For 1008 Hours @150° C.* | | | | |
| Hardness, Shore A (pts.) | 91 | 86 | 87 | 89 |
| Ultimate Elongation (%) | 15 | 65 | 65 | 40 |

TABLE 3

| Ingredient | Example 5 | 6 | 7 | 8 | 9 |
|---|---|---|---|---|---|
| Therban ™ XN532A/A4307 | 100 | 100 | 100 | 100 | 100 |
| Maglite ™ D | — | 3 | 6 | — | — |
| Suprapur ™ 6395 | — | — | — | 2.1 | 4.2 |
| Vulkanox ™ OCD/SG | 1 | 1 | 1 | 1 | 1 |
| Vulkanox ™ ZMB-2/C5 | 0.4 | 0.4 | 0.4 | 0.4 | 0.4 |
| Zinc Oxide | 3 | 3 | 3 | 3 | 3 |
| N660 Carbon Black | 50 | 50 | 50 | 50 | 50 |
| Plasthall ™ TOTM | 5 | 5 | 5 | 5 | 5 |
| DIAK ™ #7 | 1.5 | 1.5 | 1.5 | 1.5 | 1.5 |
| Vulcup ™ 40KE | 7.5 | 7.5 | 7.5 | 7.5 | 7.5 |

TABLE 4

| | Example 5 | 6 | 7 | 8 | 9 |
|---|---|---|---|---|---|
| Compound Mooney Scorch MS LR @ 125° C. (min.) | >30 | >30 | >30 | >30 | >30 |
| *Unaged Vulcanizate* | | | | | |
| Hardness, Shore A (pts.) | 73 | 71 | 70 | 74 | 72 |
| Ultimate Elongation (%) | 250 | 260 | 220 | 220 | 225 |
| *Vulcanizate Aged For 72 Hours @150° C.* | | | | | |
| Hardness, Shore A (pts.) | 79 | 78 | 77 | 78 | 79 |
| Ultimate Elongation (%) | 190 | 205 | 205 | 210 | 185 |
| *Vulcanizate Aged For 168 Hours @150° C.* | | | | | |
| Hardness, Shore A (pts.) | 81 | 80 | 83 | 83 | 82 |
| Ultimate Elongation (%) | 125 | 175 | 160 | 195 | 195 |
| *Vulcanizate Aged For 336 Hours @150° C.* | | | | | |
| Hardness, Shore A (pts.) | 85 | 81 | 83 | 84 | 84 |
| Ultimate Elongation (%) | 80 | 105 | 110 | 200 | 205 |
| *Vulcanizate Aged For 504 Hours @150° C.* | | | | | |
| Hardness, Shore A (pts.) | 86 | 83 | 84 | 86 | 85 |
| Ultimate Elongation (%) | 75 | 115 | 115 | 155 | 195 |

TABLE 5

| Ingredient | Example 10 | 11 | 12 | 13 | 14 |
|---|---|---|---|---|---|
| Therban ™ A4555 | 100 | 100 | 100 | 100 | 100 |
| Maglite ™ D | — | 3 | 6 | — | — |
| Suprapur ™ 6395 | — | — | — | 2.1 | 4.2 |
| Vulkanox ™ OCD/SG | 1 | 1 | 1 | 1 | 1 |
| Vulkanox ™ ZMB-2/C5 | 0.4 | 0.4 | 0.4 | 0.4 | 0.4 |
| Zinc Oxide | 3 | 3 | 3 | 3 | 3 |
| N660 Carbon Black | 50 | 50 | 50 | 50 | 50 |
| Plasthall ™ TOTM | 5 | 5 | 5 | 5 | 5 |
| DIAK ™ #7 | 1.5 | 1.5 | 1.5 | 1.5 | 1.5 |
| Vulcup ™ 40KE | 7.5 | 7.5 | 7.5 | 7.5 | 7.5 |

TABLE 6

| | Example 10 | 11 | 12 | 13 | 14 |
|---|---|---|---|---|---|
| Compound Mooney Scorch MS LR @ 125° C. (min.) | >30 | >30 | >30 | >30 | >30 |
| *Unaged Vulcanizate* | | | | | |
| Hardness, Shore A (pts.) | 70 | 72 | 72 | 70 | 70 |
| Ultimate Elongation (%) | 300 | 205 | 260 | 265 | 265 |
| *Vulcanizate Aged For 72 Hours @150° C.* | | | | | |
| Hardness, Shore A (pts.) | 78 | 79 | 75 | 76 | 76 |
| Ultimate Elongation (%) | 215 | 210 | 225 | 280 | 300 |
| *Vulcanizate Aged For 168 Hours @150° C.* | | | | | |
| Hardness, Shore A (pts.) | 80 | 80 | 78 | 78 | 81 |
| Ultimate Elongation (%) | 185 | 190 | 200 | 280 | 255 |
| *Vulcanizate Aged For 336 Hours @150° C.* | | | | | |
| Hardness, Shore A (pts.) | 81 | 82 | 83 | 80 | 81 |
| Ultimate Elongation (%) | 135 | 155 | 160 | 290 | 240 |
| *Vulcanizate Aged For 504 Hours @150° C.* | | | | | |
| Hardness, Shore A (pts.) | 82 | 78 | 84 | 81 | 81 |
| Ultimate Elongation (%) | 110 | 140 | 160 | 265 | 285 |
| *Vulcanizate Aged For 1008 Hours @150° C.* | | | | | |
| Hardness, Shore A (pts.) | 92 | 90 | 87 | 84 | 85 |
| Ultimate Elongation (%) | 15 | 25 | 45 | 210 | 235 |
| *Vulcanizate Aged For 1512 Hours @150° C.* | | | | | |
| Hardness, Shore A (pts.) | 91 | 96 | 91 | 87 | 84 |
| Ultimate Elongation (%) | 1 | 2 | 6 | 90 | 145 |

TABLE 7

| Ingredient | 15 | 16 | 17 | 18 | 19 | 20 | 21 | 22 |
|---|---|---|---|---|---|---|---|---|
| Therban™ XN541C | 100 | 100 | — | — | — | — | — | — |
| Therban™ XO543C | — | — | — | — | 100 | 100 | — | — |
| HNBR#1 | — | — | 100 | 100 | — | — | — | — |
| HNBR#2 | — | — | — | — | — | — | 100 | 100 |
| Dynamar™ L 13890 | — | 4.2 | — | 4.2 | — | 4.2 | — | 4.2 |
| Maglite™ D | 6 | — | 6 | — | 6 | — | 6 | — |
| Stearic Acid NBS | 1 | 1 | 1 | 1 | 1 | 1 | 1 | 1 |
| Vulkanox™ OCD/SG | 1 | 1 | 1 | 1 | 1 | 1 | 1 | 1 |
| Vulkanox™ ZMB-2/C5 | 0.4 | 0.4 | 0.4 | 0.4 | 0.4 | 0.4 | 0.4 | 0.4 |
| Zinc Oxide | 2 | 2 | 2 | 2 | 2 | 2 | 2 | 2 |
| Carbon Black, IRB#6 | 40 | 40 | 40 | 40 | 40 | 40 | 40 | 40 |
| Spider Sulfur | 0.5 | 0.5 | 0.5 | 0.5 | 0.5 | 0.5 | 0.5 | 0.5 |
| Vulkacit™ DM/C | 1.5 | 1.5 | 1.5 | 1.5 | 1.5 | 1.5 | 1.5 | 1.5 |
| Vulkacit™ Thiuram MS/C | 0.5 | 0.5 | 0.5 | 0.5 | 0.5 | 0.5 | 0.5 | 0.5 |
| Vulkacit™ Thiuram/C | 1.5 | 1.5 | 1.5 | 1.5 | 1.5 | 1.5 | 1.5 | 1.5 |

TABLE 8

| | 15 | 16 | 17 | 18 | 19 | 20 | 21 | 22 |
|---|---|---|---|---|---|---|---|---|
| Compound Mooney Scorch MS LR @ 125° C. (min.) | 9.8 | 8.6 | 27.9 | >30 | 9.1 | 7.7 | 10.5 | 11.5 |
| *Unaged Vulcanizate* | | | | | | | | |
| Hardness, Shore A (pts.) | 73 | 73 | 71 | 71 | 71 | 72 | 71 | 72 |
| Ultimate Elongation (%) | 535 | 470 | 730 | 655 | 455 | 400 | 510 | 455 |
| *Vulcanizate Aged For 72 Hours @ 150° C.* | | | | | | | | |
| Hardness, Shore A (pts.) | 78 | 78 | 77 | 76 | 76 | 76 | 76 | 77 |
| Ultimate Elongation (%) | 470 | 520 | 545 | 640 | 315 | 445 | 305 | 510 |
| *Vulcanizate Aged For 144 Hours @ 150° C.* | | | | | | | | |
| Hardness, Shore A (pts.) | 76 | 73 | 73 | 76 | 76 | 73 | 73 | 74 |
| Ultimate Elongation (%) | 355 | 540 | 480 | 640 | 225 | 455 | 180 | 475 |
| *Vulcanizate Aged For 216 Hours @ 150° C.* | | | | | | | | |
| Hardness, Shore A (pts.) | 82 | 80 | 82 | 80 | 83 | 82 | 86 | 82 |
| Ultimate Elongation (%) | 260 | 480 | 385 | 580 | 125 | 385 | 75 | 275 |
| *Vulcanizate Aged For 336 Hours @ 150° C.* | | | | | | | | |
| Hardness, Shore A (pts.) | 84 | 81 | 82 | 82 | 84 | 83 | 86 | 84 |
| Ultimate Elongation (%) | 205 | 410 | 300 | 550 | 105 | 290 | 55 | 150 |
| *Vulcanizate Aged For 504 Hours @ 150° C.* | | | | | | | | |
| Hardness, Shore A (pts.) | 89 | 85 | 86 | 83 | 90 | 85 | 94 | 88 |
| Ultimate Elongation (%) | 110 | 335 | 155 | 395 | 45 | 120 | 15 | 35 |

TABLE 9

| Ingredient | 23 | 24 | 25 | 26 | 27 | 28 | 29 | 30 |
|---|---|---|---|---|---|---|---|---|
| Therban™ A3407 | 100 | 100 | 100 | — | — | — | — | — |
| Therban™ TXN532A | — | — | — | 100 | 100 | 100 | — | — |
| Therban™ TXN533A (A3907) | — | — | — | — | — | — | 100 | 100 |
| Dynamar™ L 13890 | — | — | 4.2 | — | — | 4.2 | — | 4.2 |
| Maglite™ D | — | 6.0 | — | — | 6.0 | — | 6.0 | — |
| Vulkanox™ OCD/SG | 1 | 1 | 1 | 1 | 1 | 1 | 1 | 1 |
| Vulkanox™ ZMB-2/C5 | 0.4 | 0.4 | 0.4 | 0.4 | 0.4 | 0.4 | 0.4 | 0.4 |
| Zinc Oxide | 3 | 3 | 3 | 3 | 3 | 3 | 3 | 3 |
| Carbon Black, N550 | 50 | 50 | 50 | 50 | 50 | 50 | 50 | 50 |
| Plastholl™ TOTM | 5 | 5 | 5 | 5 | 5 | 5 | 5 | 5 |
| DIAK™ #7 | 1.5 | 1.5 | 1.5 | 1.5 | 1.5 | 1.5 | 1.5 | 1.5 |
| Vulcup™ 40KE | 7.5 | 7.5 | 7.5 | 7.5 | 7.5 | 7.5 | 7.5 | 7.5 |

TABLE 10

| | 23 | 24 | 25 | 26 | 27 | 28 | 29 | 30 |
|---|---|---|---|---|---|---|---|---|
| Compound Mooney Scorch MS LR @ 125° C. (min.) | >30 | >30 | >30 | >30 | >30 | >30 | >30 | >30 |
| *Unaged Vulcanizate* | | | | | | | | |
| Hardness, Shore A (pts.) | 73 | 73 | 72 | 73 | 75 | 73 | 73 | 73 |
| Ultimate Elongation (%) | 255 | 195 | 210 | 275 | 235 | 240 | 235 | 245 |
| *Vulcanizate Aged For 168 Hours @150° C.* | | | | | | | | |
| Hardness, Shore A (pts.) | 82 | 81 | 81 | 84 | 84 | 85 | 83 | 83 |
| Ultimate Elongation (%) | 180 | 190 | 250 | 150 | 160 | 240 | 185 | 260 |
| *Vulcanizate Aged For 504 Hours @150° C.* | | | | | | | | |
| Hardness, Shore A (pts.) | 86 | 84 | 81 | 89 | 85 | 86 | 86 | 84 |
| Ultimate Elongation (%) | 55 | 85 | 220 | 35 | 70 | 180 | 70 | 260 |
| *Vulcanizate Aged For 1008 Hours @150° C.* | | | | | | | | |
| Hardness, Shore A (pts.) | 90 | 92 | 83 | 88 | 94 | 89 | 85 | 87 |
| Ultimate Elongation (%) | 15 | 35 | 155 | 5 | 15 | 135 | 25 | 210 |
| *Vulcanizate Aged For 1512 Hours @150° C.* | | | | | | | | |
| Hardness, Shore A (pts.) | 93 | 96 | 89 | 96 | 95 | 90 | 97 | 90 |
| Ultimate Elongation (%) | 0 | 5 | 140 | 0 | 0 | 85 | 5 | 150 |

What is claimed is:

1. A vulcanizable composition comprising:
   (i) a nitrile polymer consisting essentially of one or more conjugated dienes and one or more unsaturated nitriles and optionally, one or more bounded unsaturated carboxylic acid;
   (ii) a filler;

(iii) an additive selected from the group consisting of a strong base, a salt of a strong base and a weak acid, a salt of a weak acid, a carbodiimide, a polycarbodiimide and mixtures thereof; and (iv) a vulcanization system.

2. The vulcanizable composition defined in claim 1, wherein the nitrile polymer comprises a copolymer of a conjugated diene and an unsaturated nitrile.

3. The vulcanizable composition defined in claim 2, wherein the conjugated diene is a $C_4$–$C_6$ conjugated diene.

4. The vulcanizable composition defined in claim 3, wherein the $C_4$–$C_6$ conjugated diene is butadiene.

5. The vulcanizable composition defined in claim 2, wherein the unsaturated nitrile is a $C_{3-C5}$ α,β-unsaturated nitrile selected from the group consisting of acrylonitrile, methacrylonitrile, ethacrylonitrile and mixtures thereof.

6. The vulcanizable composition defined in claim 2, wherein the copolymer comprises from about 40 to about 85 weight percent of the copolymer of bound conjugated diene and from about 15 to about 60 weight percent of the copolymer of bound unsaturated nitrile.

7. The vulcanizable composition defined in claim 2, wherein the nitrile polymer is a copolymer of butadiene and acrylonitrile.

8. The vulcanizable composition defined in claim 7, wherein the copolymer comprises from about 55 to about 75 weight percent of the copolymer of bound butadiene and from about 25 to about 45 weight percent of the copolymer of bound acrylonitrile.

9. The vulcanizable composition defined in claim 2, wherein the copolymer is hydrogenated.

10. The vulcanizable composition defined in claim 9, wherein the copolymer comprises a residual carbon-carbon double bond unsaturation of less than about 30 mole percent.

11. The vulcanizable composition defined in claim 1, wherein the salt of a strong base and a weak acid has a $pk_a$ of at least about 9.0.

12. The vulcanizable composition defined in claim 1, wherein the additive is a Group I metal salt of a weak acid, optionally in combination with a carbodiimide, a polycarbodiimide, and mixtures thereof.

13. The vulcanizable composition defined in claim 1, wherein the Group I metal is sodium or potassium, and the weak acid is selected from carbonic acid or $C_1$–$C_{30}$ fatty acids.

14. The vulcanizable composition defined in claim 1, wherein the additive is present in an amount of from about 0.5 to about 30 parts by weight per hundred parts by weight of nitrile polymer.

15. A process for producing a nitrile polymer vulcanizate comprising the step of vulcanizing the vulcanizable composition defined in claim 1.

16. A polymer vulcanizate produced by the process defined in claim 15.

17. A method for improving the hot air aging characteristics of a nitrile polymer comprising the step of admixing a nitrile polymer consisting essentially of one or more conjugated dienes and one or more unsaturated nitriles and optionally, one or more bounded unsaturated carboxylic acid with an additive selected from the group consisting of a strong base, a salt of a strong base and a weak acid, a salt of a weak acid, a carbodiimide, a polycarbodiimide and mixtures thereof.

18. The method defined in claim 17, wherein the nitrile polymer comprises a copolymer of a conjugated diene and an unsaturated nitrile.

19. The method defined in claim 17, wherein the nitrile polymer is a copolymer of butadiene and acrylonitrile.

20. The method defined in claim 17, wherein the salt of a strong base and a weak acid has a $pk_a$ of at least about 9.0.

21. The method defined in claim 17, wherein the additive is a Group I metal salt of a weak acid, optionally in combination with a carbodiimide, a polycarbodiimide, or mixtures thereof.

22. The method defined in claim 17, wherein the Group I metal is selected from sodium and potassium, and the weak acid is selected form carbonic acid and $C_1$–$C_{30}$ fatty acid.

23. The method defined in claim 17, wherein the additive is present in an amount of from about 0.5 to about 30 parts by weight per hundred parts per weight of nitrile polymer.

24. The method defined in claim 17, further comprising admixing a vulcanization system with the nitrile polymer and the additive.

25. The method defined in claim 17, further comprising admixing a filler with the nitrile polymer and the additive.

26. The method defined in claim 17, further comprising admixing a vulcanization system and a filler with the nitrile polymer and the additive.

27. A hydrogenated nitrile polymer vulcanizate having a hot air aging time to reach 100% elongation at break of at least about 200 hours when measured pursuant to ASTM-D573-88 at 150° C., the vulcanizate derived from a sulfur-based vulcanization system and a nitrile polymer consisting essentially of one or more conjugated dienes and one or more unsaturated nitriles and optionally, one or more bounded unsaturated carboxylic acid.

* * * * *